United States Patent [19]
Favreau

[11] 3,969,762
[45] July 13, 1976

[54] SECAM COLOR TELEVISION RECEIVERS EMPLOYING TUNABLE NOTCH FILTER IN LUMINANCE CHANNEL
[75] Inventor: Michel Favreau, Paris, France
[73] Assignee: Thomson-CSF, Paris, France
[22] Filed: July 22, 1975
[21] Appl. No.: 598,161

[30] Foreign Application Priority Data
July 26, 1974 France .............................. 74.26059

[52] U.S. Cl. ................................... 358/38; 358/14
[51] Int. Cl.² ........................................... H04N 9/40
[58] Field of Search .......................... 358/14, 39, 38

[56] References Cited
FOREIGN PATENTS OR APPLICATIONS
1,031,246   1966   United Kingdom ................... 358/14

Primary Examiner—George H. Libman
Assistant Examiner—John C. Martin
Attorney, Agent, or Firm—Cushman, Darby and Cushman

[57] ABSTRACT
In the luminance signal channel, the notch filter 40 which considerably attenuates the subcarrier is a variable filter whose tuning is controlled by a signal which is a function of the instantaneous frequency of the subcarrier.

4 Claims, 1 Drawing Figure

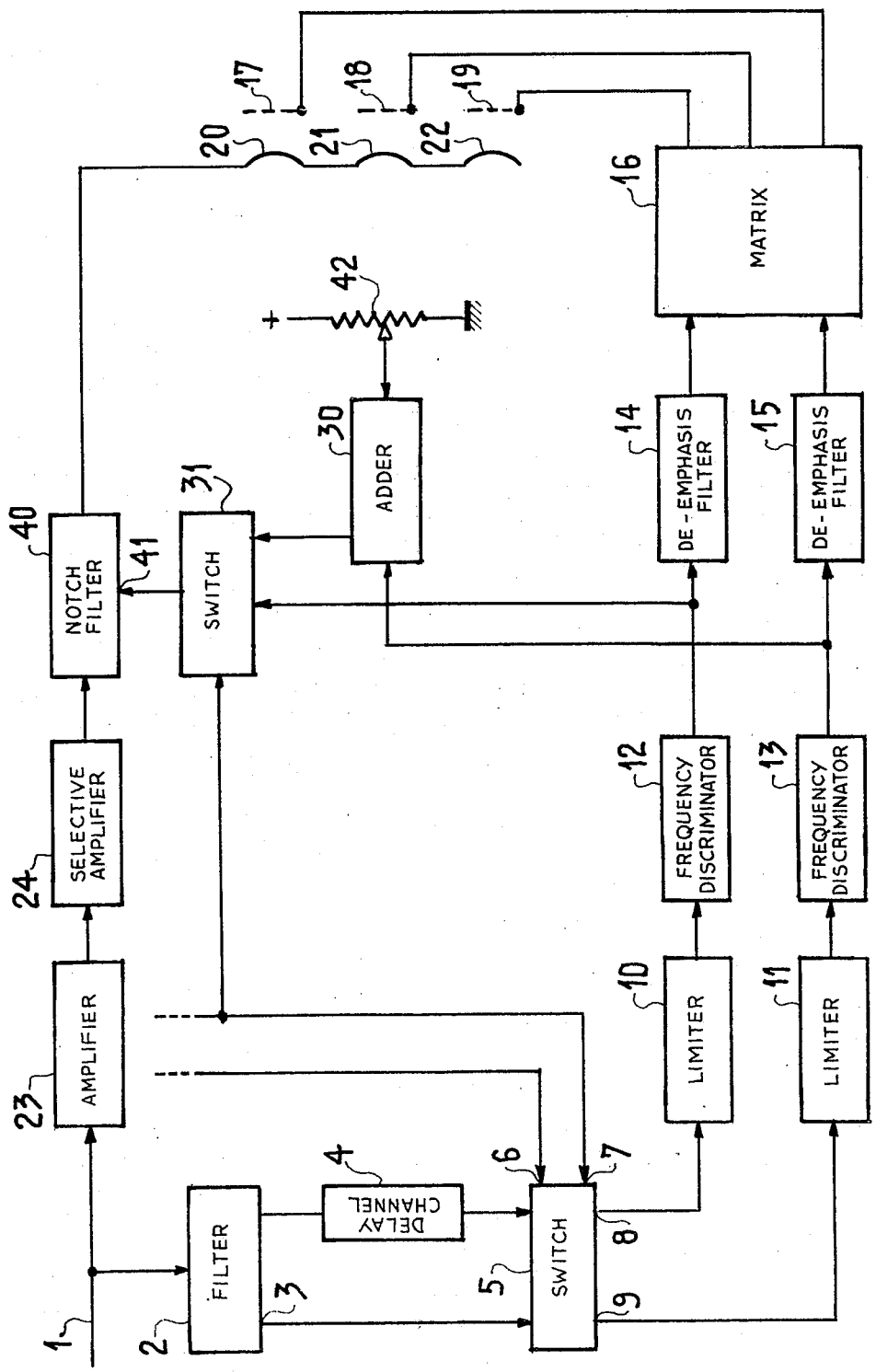

SECAM COLOR TELEVISION RECEIVERS EMPLOYING TUNABLE NOTCH FILTER IN LUMINANCE CHANNEL

The present invention relates to an improvement the colour television receivers, operating in a system where the colour television signal includes a subcarrier which is alternately frequency modulated by two colour signals.

Those skilled in the art will be aware that in the SECAM system (as now operated in France) the chrominance information frequency modulates a subcarrier located in the upper portion of the luminance spectrum. The latter extends from 0 to 6 MHz approximately and the subcarrier, whose frequency swing extends from 3.9 to 4.75MHz, is mixed with the luminance spectrum. Various systems have been devised to prevent cross modulation between the luminance signal present in this part of the spectrum, and the frequency modulated subcarrier.

The method currently used consists in reducing the amplitude (by a method of encoding involving filtering and selective clipping) of the luminance components located in said spectrum to a value less than around half the minimum level of the subcarrier.

At the receiving end, it is current usage to still further reduce the extent to which this disturbance becomes visible, in the decoders of modern television receivers, by the use of a comparately wide-band notch filter tuned to the mean frequency of the subcarrier and arranged in the luminance channel.

The present invention makes it possible to reduce distortion thus experienced by the luminance signal in the coder and the decoder, by using in the receiver a tunable notch filter controlled by the output signals from the discriminators in order to centre the tuning on the instantaneous frequency of the subcarrier.

The invention will be better understood from a consideration of the following description and the related FIGURE illustrating an embodiment of the invention.

In the FIGURE, a fragmentary illustration of the decoder of an improved SECAM receiver in accordance with the invention, can be seen.

At the point 1 there is applied the video signal resulting from the detection of the subcarrier, this signal being applied to a band-pass filter 2 which isolates the subcarrier and compensates for the subcarrier frequency emphasis introduced in the encoder. The output of the filter 2 supplies a direct channel 3 and a channel 4 containing a delay device introducing a delay equal to the duration of a line. The direct channel 3 and the delay channel 4 supply the two inputs of a double switch 5 which changes state at the line frequency, under the control of the control signals applied to its inputs 6 and 7 and obtained in a known manner. The switch 5 thus supplies at its first output 8 the blue chrominance subcarrier and at its output 9 the red chrominance subcarrier. The outputs 8 and 9 respectively supply, through two limiters 10 and 11, two frequency discriminators 12 and 13 which reconstitute the modulating signals and are followed by two de-emphasis filters 14 and 15.

These two filters supply a matrix 16 which supplies the red and blue chrominance signals with the appropriate levels and polarity.

Those skilled in the art will be aware that not only does the resting frequency of the subcarrier differ in relation to red and blue chrominance signals, being 4,406.25 kc/s in the first case and 4,250 kc/s in the second, but that furthermore the proportionality coefficients between the frequency deviation and the chrominance signals, differ in absolute value and are of opposite sign.

The matrix on the other hand delivers the green chrominance signal which is a linear and homogeneous combination of the red and blue ones.

The three chrominance signals are then added to the luminance signal in order to furnish the red, green and blue signals for operation of the three-colour tube, this additional operation being carried out by applying the chrominance signals to the modulating electrodes 17, 18, 19 of the three electron-guns of the picture tube, the luminance signal being applied in parallel to the three cathodes 20, 21 and 22.

More precisely, these cathodes are supplied in the following way. The input 1 supplies an amplifier 23 comprising a delay element compensating for the difference between the propagation times of the luminance signal and the chrominance subcarrier.

In the prior art, the output of the amplifier 23 is preferably connected to the three cathodes 20, 21 and 22 either directly or through a fix-tuned filter, known as a notch filter, of the kind referred to earlier.

In accordance with the invention, the amplifier 23 is followed by a selective amplifier 24 which selectively amplifies the frequencies attenuated at the time of coding (band extending from 3.9 to 4.75 MHz). The amplifier 24 can be constituted by a transistor in a common-emitter arrangement, the load comprising in series a resistor and a parallel resonant circuit containing a damping resistor and tuned to the frequency 4.3 MHz, the parameters being calculated in order that the band from 3.9 to 4.75 MHz is amplified approximately in the ratio of 2 for example, in relation to the low and medium frequencies.

This selective amplifier 24 is followed by a notch filter 40 whose band-width is narrower than that of the conventional notch filter but whose tuning, in other words its maximum attenuation frequency, is controlled as a function of the value of the instantaneous frequency of the subcarrier as translated by the output signal from the discriminators. Those skilled in the art will be aware, in other words, that the majority of the energy of the modulated subcarrier is concentrated in any instant in the neighbourhood of said instantaneous frequency.

The notch filter may for example be constituted by an amplifier whose load comprises a series resonant circuit, the capacitance of the series resonant circuit being constituted by two variable-capacitance diodes connected in series, the internal terminal of which (common to the two diodes) being connected to the tuning inductor.

The two diode are reverse-biased by a direct bias voltage applied across their external terminals and determining the tuning frequency in the absence of the control signal, the latter being applied to the control input 41 of the notch filter 40. This control signal is applied symmetrically between the two external terminals and is superimposed upon the direct voltage. Because of this arrangement, the control voltage is not mixed with the output signal from the notch filter.

As mentioned earlier, the resting frequency for transmission of the red chrominance signal exceeds by 4,406.25 KHz − 4,250 = 156.25 KH the resting frequency used for transmitting the blue chrominance modulating signal.

If it is desired to control the tuning frequency of the notch filter as a function of the output signals $D'_R$ and $D'_R$ from the discriminators, then the law must of course be the same.

If we call $F_i$ the instantaneous frequency and $k$ the reciprocal of the conversion factor of the discriminators in kc/s per volt, then we have $F_i = 4,250 + kD'_B$ when blue chrominance is being transmitted and $F_i = 4,406.25 + kD'_R$ when red chrominance is being transmitted.

This second equality can be written as $F_i = 4,250 + kD'_R + 106.25 = 4,250 + k(D'_R + \Delta V)$ where $\Delta V = 106.25/k$.

The output of the discriminator 13 is then taken to an adder 30 whose second input is supplied with the constant voltage $\Delta V$ from a variable source 42 represented by a potentiometer. The output of the discriminator 12 and the output of the adder 30 are connected to the two inputs of a switch 31 controlled synchronously with the double switch 5, by one of the control signals for the latter, so as to apply to its output the signal coming from that of the two discriminators which is being supplied through the direct channel 3.

The output of the switch 31 is connected to the control input of the notch filter 40.

It will be observed that not only is the phase response of the luminance signal less affected by a narrow-band notch filter than by a relatively wide-band one, but furthermore that the frequency response is also improved since it is possible to reproduce certain frequencies of the luminance spectrum which were completely suppressed by the wide-band notch filter.

On the other hand, because of the shift in the frequency of a given scanned colour, from one line to the next, the "recovered" luminance information corresponds to different parts of the spectrum as well end can thus be complete to a certain extent. This brings the effect obtained closer to that which would be given by the complete transmission of the luminance spectrum.

This can even happen in the case where non-coloured areas are involved, if the notch filter is sufficiently narrow, due to the 150 kc/s shift, approximately, between the resting frequencies used for the two chrominance signals.

Although the modulation of the filter may be extremely fast, certian transitions could fall outside the effective range. This is a transient effect and is virtually invisible.

In SECAM system receivers, demodulation is generally carried out after repetition of the signals. It will be clear that if the contrary is the case, only one discriminator will be used. However, switching will still be necessary in order to add the correcting signal $\Delta V$ in the course of every other line.

In either case, the effect is the same if $\Delta V$ is either added to the output signal from the red chrominance discriminator, with a filter which, for zero control signal, is centred on the resting frequency utilised for the blue chrominance, or subtracted from the output signal produced by the other discriminator, provided that the tuning frequency of the filter is correspondingly chosen, for a zero control signal.

Finally, in view of the fact that whatever the chrominance transmitted, the instantaneous frequency sweep remains within the interval from 3.900 to 4.756,25 KHz, it is possible if required to obtain a better range of variation in the capacitance of the diode by centring the tuning frequency of the filter (in the absence of the control signal) on the centre frequency $$\frac{3.900 + 4.756,25 \text{ kHz}}{2} = 4.328,12 \text{ kHz}$$

which is also the mean value of the two resting frequencies. In this case it is necessary to add $\Delta V/2$ to the output signal from the discriminator 13 and to subtract $\Delta V/2$ from the output signal from the discriminator 12, to control the filter.

Of course, the invention is not limited to the embodiments described and shown which were given solely by way of example. What is claimed is:

1. A colour television receiver for operating in a system where the colour television signal comprises a luminance signal and a subcarrier which is alternately frequency modulated by first and second colour signals, the alternation occurring at the line frequency, said receiver comprising a luminance channel including a notch filter for attenuating the subcarrier, and a colour channel, including delay means, switching means and frequency demodulating means, for simultaneously delivering the colour signal derived from the color television signal being received and the colour signal derived from the colour television signal received at a time T earlier, where T is the line period, wherein said notch filter is a variable notch filter having a control input for receiving a signal determining the frequency at which said notch filter imparts maximum attenuation, and wherein said receiver comprises a circuit, coupled to said frequency demodulating means, for delivering to said control input a signal which is a function of the instantaneous frequency of said subcarrier.

2. A receiver as claimed in claim 1, wherein said delay means are a delay line for repeating said subcarrier, wherein said frequency demodulating means include first and second frequency demodulators, and wherein said colour channel comprise switching means for feeding the undelayed subcarrier and the delayed subcarrier to said first or second demodulators according to whether the modulating signal is said first or second colour signal, and said circuit comprises two control channels having respective inputs respectively coupled to said frequency demodulators, and respective outputs, a switch having two inputs respectively coupled to said outputs of said two control channels and an output connected to said control input.

3. A colour television receiver as claimed in claim 2 wherein, said subcarrier having two different resting frequencies according to whether it its modulated by said first and second colour signal, at least one of said control channels comprises an adder for adding a signal having a fixed amplitude and a fixed polarity to the input signal of this control channel.

4. A colour television receiver as claimed in claim 1 wherein said luminance channel comprises an amplifier for selectively amplifying those components of said colour television signal whose frequencies lie in the frequency deviation range of said subcarrier.

* * * * *